(12) United States Patent
Rehman et al.

(10) Patent No.: US 12,132,913 B2
(45) Date of Patent: Oct. 29, 2024

(54) PERCEPTUAL QUALITY ASSESSMENT METRIC BASED CONTENT AND VIEWER AWARE ENCODING

(71) Applicant: IMAX CORPORATION, Mississauga (CA)

(72) Inventors: Abdul Rehman, Kitchener (CA); Zhou Wang, Waterloo (CA); Ahmed Badr, Waterloo (CA); Christopher Vytautas Olekas, Breslau (CA); Ian Wormsbecker, Baden (CA); Waqas Ahmed, London (GB); Peter Olijnyk, Kitchener (CA)

(73) Assignee: IMAX CORPORATION, Mississauga (CA)

( * ) Notice: Subject to any disclaimer, the term of this patent is extended or adjusted under 35 U.S.C. 154(b) by 0 days.

(21) Appl. No.: 18/329,261

(22) Filed: Jun. 5, 2023

(65) Prior Publication Data

US 2023/0319290 A1    Oct. 5, 2023

Related U.S. Application Data

(63) Continuation of application No. 17/320,723, filed on May 14, 2021.

(Continued)

(51) Int. Cl.
*H04N 19/154* (2014.01)
*H04N 19/103* (2014.01)
(Continued)

(52) U.S. Cl.
CPC ......... *H04N 19/154* (2014.11); *H04N 19/103* (2014.11); *H04N 19/149* (2014.11); *H04N 19/184* (2014.11)

(58) Field of Classification Search
CPC .. H04N 19/154; H04N 19/103; H04N 19/149; H04N 19/184; H04N 19/85; H04N 19/179; H04N 19/115
See application file for complete search history.

(56) References Cited

U.S. PATENT DOCUMENTS 5,231,484 A * 7/1993 Gonzales ............. H04N 19/192
                                                    375/E7.13
6,167,087 A * 12/2000 Kato .................... H04N 19/176
                                                    375/E7.157

(Continued)

FOREIGN PATENT DOCUMENTS

| CA | 2975904 A1 | 8/2016 |
| EP | 3322189 A1 | 5/2018 |
| WO | 2017130183 A1 | 8/2017 |

OTHER PUBLICATIONS

Rainer et al., "Statistically Indifferent Quality Variation: An Approach for Reducing Multimedia Distribution Cost for Adaptive Video Streaming Services", IEEE Transactions on Multimedia, Apr. 4, 2027, pp. 849-860, vol. 19, No. 4.

*Primary Examiner* — Tracy Y. Li
(74) *Attorney, Agent, or Firm* — Brooks Kushman P.C.

(57) ABSTRACT

Candidate encodes of a source video are produced using a plurality of encoding configurations. Quality of experience (QoE) scores for each of the candidate encodes are computed. The QoE scores of the plurality of candidate encodes are compared to determine a lowest bitrate encode that achieve a target QoE score. The lowest bitrate encode that achieve the target QoE score as an optimized output video is selected.

24 Claims, 12 Drawing Sheets

Related U.S. Application Data

(60) Provisional application No. 63/024,865, filed on May 14, 2020.

(51) Int. Cl.
*H04N 19/149* (2014.01)
*H04N 19/184* (2014.01)

(56) References Cited

U.S. PATENT DOCUMENTS

| | | |
|---|---|---|
| 6,654,417 B1 | 11/2003 | Hui |
| 8,824,547 B2 | 9/2014 | Nilsson et al. |
| 9,699,463 B2 | 7/2017 | Schmidt et al. |
| 10,567,825 B2 | 2/2020 | Jones et al. |
| 2006/0062292 A1* | 3/2006 | Boice .................. H04N 19/196 375/E7.181 |
| 2009/0086816 A1 | 4/2009 | Leontaris et al. |
| 2012/0201476 A1 | 8/2012 | Carmel et al. |
| 2018/0084284 A1 | 3/2018 | Rosewarne et al. |
| 2019/0200024 A1* | 6/2019 | Kubota .................. H04N 19/14 |
| 2020/0169593 A1 | 5/2020 | Katsavounidis |
| 2020/0252618 A1* | 8/2020 | Eng .................. H04N 21/2402 |
| 2020/0288164 A1 | 9/2020 | Lin et al. |

* cited by examiner

PERCEPTUAL QUALITY ASSESSMENT METRIC BASED CONTENT AND VIEWER AWARE ENCODING

CROSS-REFERENCE TO RELATED APPLICATIONS

This application is a continuation of U.S. application Ser. No. 17/320,723 filed May 14, 2021, now allowed, which, in turn, claims the benefit of U.S. provisional application Ser. No. 63/024,865 filed May 14, 2020, the disclosures of which are hereby incorporated in their entirety by reference herein.

TECHNICAL FIELD

Aspects of the disclosure generally relate to optimization of video encoding in digital images and videos using a perceptual quality assessment metric.

BACKGROUND

Video encoding is a process of converting digital video files from one format to another. A bitrate is an amount of data conveyed per unit time. From a streaming perspective, the higher the bitrate, the higher the quality, and the more bandwidth that is required. Generally, the more complex the video, the lower the quality of encoded video will be when the same amount of bitrate is spent during the encoding. Thus, determining what bitrate to use to encode content can be a very important determination when it comes to optimizing encoding.

SUMMARY

In one or more illustrative examples, a method for optimization of video encoding using perceptual quality assessment is performed. Candidate encodes of a source video using a plurality of encoding configurations are produced. Quality of experience (QoE) scores for each of the candidate encodes are computed. The QoE scores of the plurality of candidate encodes are compared to determine a lowest bitrate encode that achieve a target QoE score. The lowest bitrate encode that achieve the target QoE score is selected as an optimized output video.

In one or more illustrative examples, a method for optimization of video encoding using perceptual quality assessment is performed. A content complexity metric is produced by pre-processing source content to determine a relative difficulty for encoding the source content, the content complexity metric being independent of encoder implementation. The content complexity metric is transformed into an absolute difficulty for encoding the source content, the absolute difficulty being specific to an encoder implementation. The absolute difficulty is utilized to determine an encoding configuration for the source content, the encoding configuration specifying a bitrate to achieve a target QoE score for the source content when encoded into an output encode using the encoder implementation. Video encoding of the source content is performed using the encoding configuration for the encoder implementation to create the output encode.

In one or more illustrative examples, a method for optimization of video encoding using perceptual quality assessment is performed. Encoder-specific content complexity metrics are produced for a plurality of encoding standards, configurations, and implementations. The encoding standard, configuration, and implementation that provides a best perceptual experience within bitrate and compute complexity constraints is selected.

In one or more illustrative examples, a method for optimization of video encoding using perceptual quality assessment is performed. A content complexity metric is produced by pre-processing source content to determine a relative difficulty for encoding the source content, the content complexity metric indicating a measure of how detailed the source content is in terms of spatial and temporal information. The content complexity metric is used to classify the source content into one of a pre-determined set of buckets, each bucket representing a category of video content having a different range of content complexity scores and being associated with an adaptive bitrate (ABR) ladder specific to the range. The video is encoded according to the ABR ladder of the one of the plurality of buckets into which the source content is categorized.

In one or more illustrative examples, a system for optimization of video encoding using perceptual quality assessment is performed using a computing device. Candidate encodes of a source video using a plurality of encoding configurations are produced. Quality of experience (QoE) scores for each of the candidate encodes are computed. The QoE scores of the plurality of candidate encodes are compared to determine a lowest bitrate encode that achieves a target QoE score. The lowest bitrate encode that achieves the target QoE score is selected as an optimized output video.

In one or more illustrative examples, a system for optimization of video encoding using perceptual quality assessment is performed using a computing device. A content complexity metric is produced by pre-processing source content to determine a relative difficulty for encoding the source content, the content complexity metric being independent of encoder implementation. The content complexity metric is transformed into an absolute difficulty for encoding the source content, the absolute difficulty being specific to an encoder implementation. The absolute difficulty is utilized to determine an encoding configuration for the source content, the encoding configuration specifying a bitrate to achieve a target QoE score for the source content when encoded into an output encode using the encoder implementation. Video encoding of the source content is performed using the encoding configuration for the encoder implementation to create the output encode.

In one or more illustrative examples, a system for optimization of video encoding using perceptual quality assessment is performed using a computing device. Encoder-specific content complexity metrics are produced for a plurality of encoding standards, configurations, and implementations. The encoding standard, configuration, and implementation that provides a best perceptual experience within bitrate and compute complexity constraints is selected.

In one or more illustrative examples, a system for optimization of video encoding using perceptual quality assessment is performed using a computing device. A content complexity metric is produced by pre-processing source content to determine a relative difficulty for encoding the source content, the content complexity metric indicating a measure of how detailed the source content is in terms of spatial and temporal information. The content complexity metric is used to classify the source content into one of a pre-determined set of buckets, each bucket representing a category of video content having a different range of content complexity scores and being associated with an ABR ladder specific to the range. The video is encoded according to the ABR ladder of the one of the plurality of buckets into which the source content is categorized.

DETAILED DESCRIPTION

Figure 1:
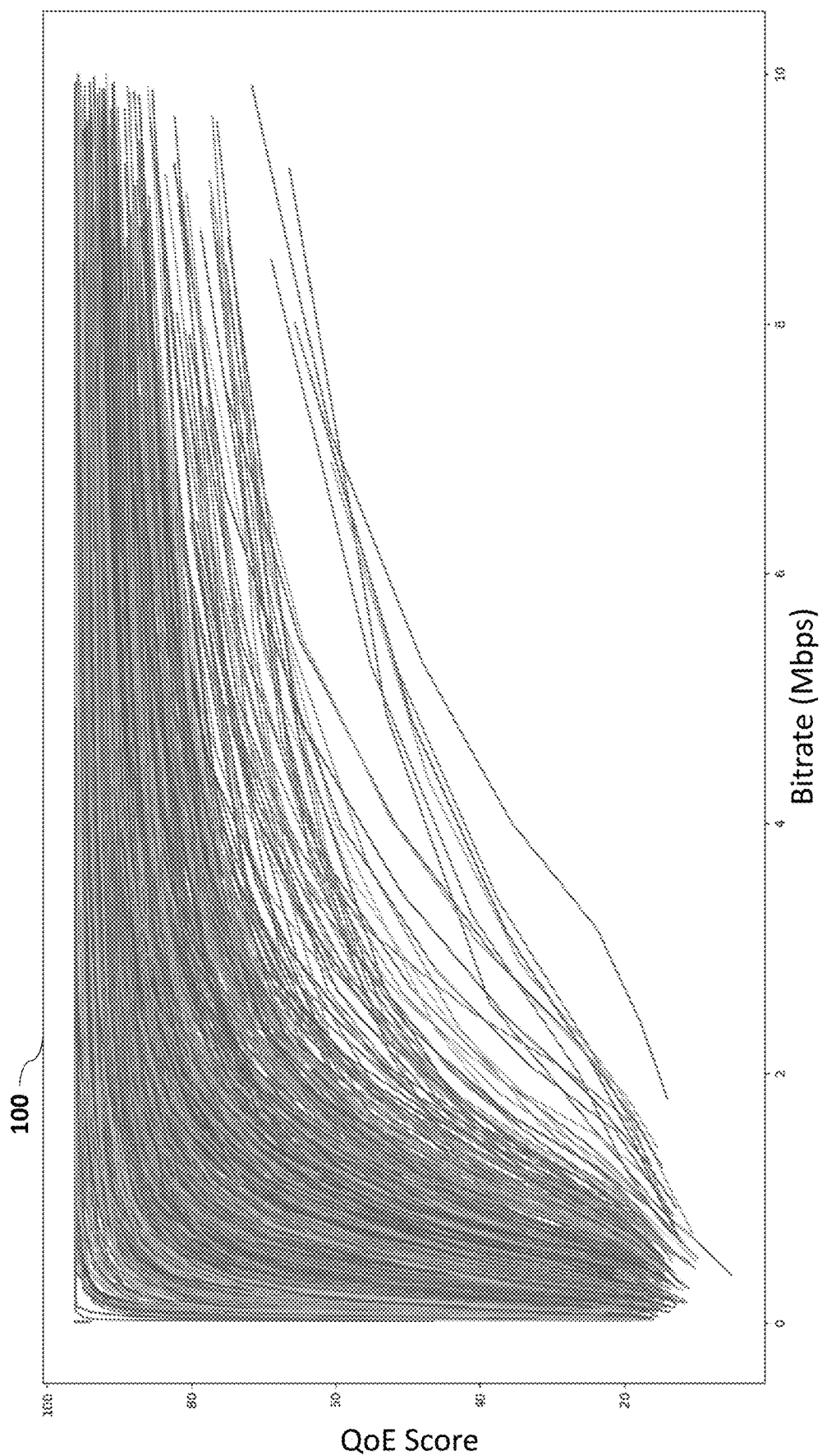
FIG. 1 illustrates a graph of performance of various unoptimized encoders on example video content

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Digital images and videos are subject to a wide variety of distortions during acquisition, processing, compression, storage, delivery, playback, and display. These distortions may result in a degradation of viewer experience. For applications in which images and videos are ultimately to be viewed by human beings, a reliable method of quantifying visual image and video quality is through subjective evaluation. In practice, however, subjective evaluation is inconvenient, time-consuming and expensive.

Objective image and video quality metrics may predict perceived image quality automatically. The simplest and most widely used quality metric is the mean squared error (MSE), computed by averaging the squared intensity differences of distorted and reference image pixels, along with the related quantity of peak signal-to-noise ratio (PSNR). However, such techniques are poorly matched to how visual quality would be perceived by a human viewer.

A more advanced perceptual quality assessment metric may be used to predict viewer experience prediction in real-time. QoE of a video, as used herein, relates to mapping of human perceptual quality of experience (QoE) onto an objective scale, i.e., the average score given by human subjects when expressing their visual QoE when watching the playback of a video content. For example, a score may be defined on a scale of 0-100, which can be evenly divided to five quality ranges of bad (0-19), poor (20-39), fair (40-59), good (60-79), and excellent (80-100), respectively. Such a metric may compute a multi-dimensional quality map of a video being assessed, where the map indicates the local quality variations of the video in various spatial dimensions, scale dimension, time dimension, and distortion dimensions. An example of an advanced perceptual quality metric is the SSIMPLUS index.

In video encoding, the more complex the spatial and temporal content of the video, or even a specific title, scene, frame, the worse the quality of encoded video will be perceived to a viewer when the same amount of bitrate is used during the encoding. However, encoding the video using a higher bitrate may require additional bandwidth to transmit the video. One solution is to use an encoding ladder to produce multiple different encodes of the content. The ladder may include several encoding configurations or profiles outlining a spectrum of bitrate/resolution combinations used to encode video content. In some cases, multiple adaptive bitrate (ABR) ladders may be used for the same content, for example for different input stream quality levels (e.g., low quality, high quality, etc.), for different output stream quality levels (e.g., low quality service, high quality premium service, etc.), for supporting end user devices that use different decoders, for different output resolutions (e.g., 144p, 240p, 360p, 480p, 720p, 1080p), etc. An encoder or transcoder may create, for each received instance of video content, a set of time-aligned video streams, each having a different bitrate and resolution according to the ladder. A user may then choose among the available ladder encodings based on bandwidth or other device requirements.

Video encoders aim at achieving the best compromise between video quality and bitrate under various practical constraints. However, encoding performance varies significantly across content types, and even within a genre. This inconsistency, in part, is a result of an inability of encoders to accurately measure source content complexity. As a result, simple spatial and temporal content achieves significantly higher quality than more complex spatial and temporal content. Moreover, the specific encoder configuration or ladder configuration may not be optimized for the content to be delivered, resulting in dissatisfied viewers.

As explained in detail herein, perceptual quality assessment of content may be used to improve the operation of video encoding. By taking advantage of QoE score, in combination with other heuristics for bitrate allocation, content behavior may be used to drive encoding decisions to achieves target QoE at the lowest possible bitrate. In some examples, these decisions may be made at the scene, segment, chunk, chapter, or asset level to provide for optimization of content encoding parameters by scene, segment, chunk, chapter, or asset level.

By optimization, it is meant to maximize a certain objective function under certain constraints, by finding in a domain of operation points the best operation point that achieves or best approximates that maximum of the objective function meanwhile satisfying the constraints. Specifically, in the case of encoder optimization, the optimization task may be defined in two cases. In the first case, the objective function may be image/video quality or quality-of-experience that may be defined as human subjective quality such as mean opinion score (MOS) or an objective quality/QoE metric such as SSIMPLUS. The constraint may be the maximum of allowed overall average bitrate of an image or video stream/asset, or the maximum of allowed bitrate for each time segment of the image or video stream/asset. The operation space includes all permissible selections and combinations of encoding standards and tools, encoders, and encoding configurations. In the second case, the objective function may be the negative of the overall average bitrate, or the bitrate for each time segment. The constraint may be the minimum of allowed average quality/QoE or the minimum of allowed quality/QoE for each time segment. And similar to the first case, the operation space includes all permissible selections and combinations of encoding standards and tools, encoders, and encoding configurations.

FIG. 1 illustrates a graph 100 of performance of various unoptimized encoders on example video content. In the graph 100, the X-axis indicates bitrate in Mbps, while the Y-axis indicates a QoE metric performed for encoding of the example video content at the bitrate. Some encoders may produce encoded video having a higher QoE than other encoders for a given bitrate. However, this QoE may vary based on the bitrate as well as on the content being encoded (e.g., based on the content complexity). Accordingly, use of a single encoder configuration may deliver inconsistent media content experiences.

Figure 2:
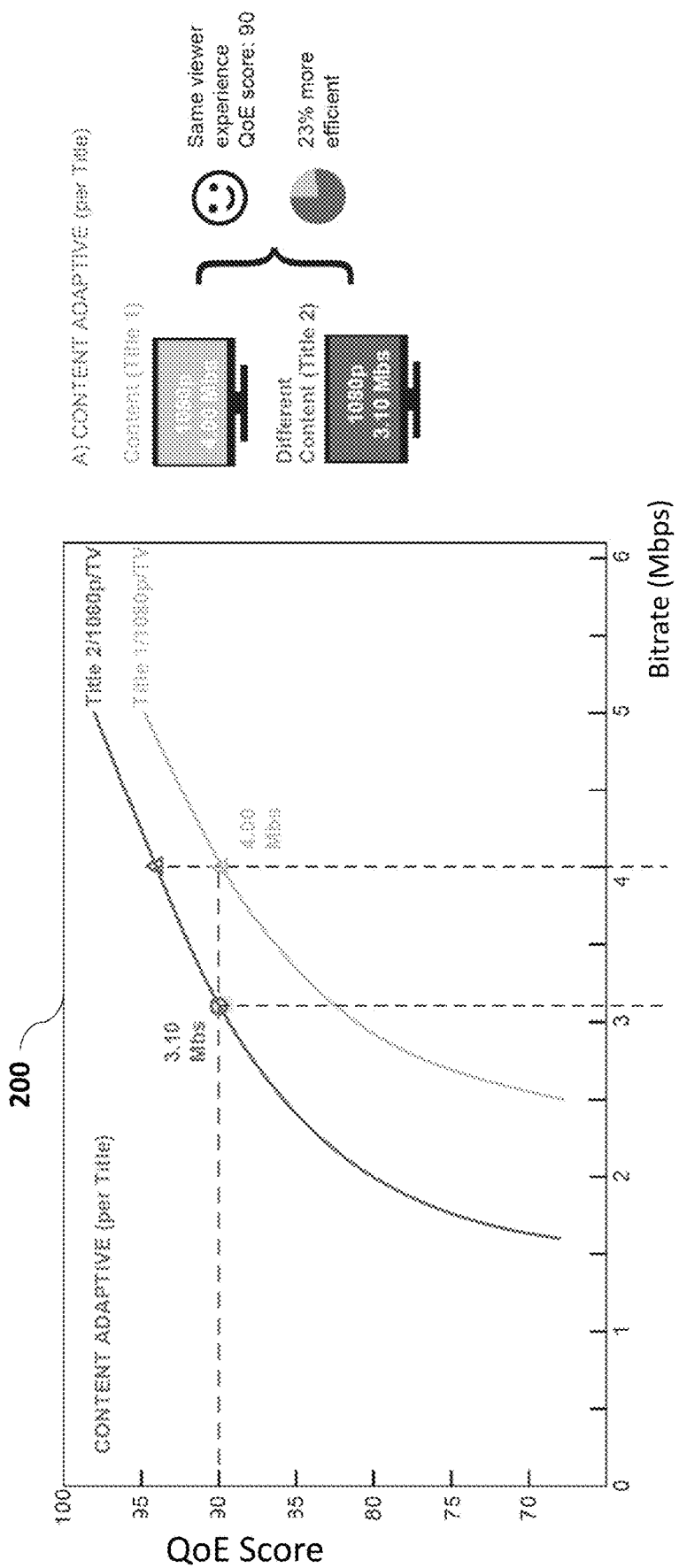
FIG. 2 illustrates a graph showing example bitrates for two video titles to achieve a target QoE score.

FIG. 2 illustrates a graph 200 showing example bitrates for two video titles to achieve a target QoE score. As with the graph 100, in the graph 200 the X-axis indicates bitrate, while the Y-axis indicates perceptual quality assessment metric at the bitrate. In this example, a QoE score of 90 is targeted for the encoding of the two videos, Title 1 and Title 2. Each of the videos is also targeted for encoding at the same output resolution, in the example 1080p (e.g., 1920×1080). As indicated for Title 1, a minimum bitrate of 4.0 Mbps may be used to achieve the target QoE score. As indicated for Title 2, a minimum bitrate of 3.1 Mbps may be used to achieve the target QoE score. Based on these bitrates and QoE scores, encoding of Title 2 may be performed 23% more efficiently than the encoding of Title 1. Thus, a scheme that adapts encoding to content (i.e., content adaptation) may result in a significantly lower bitrate.

Figure 3:
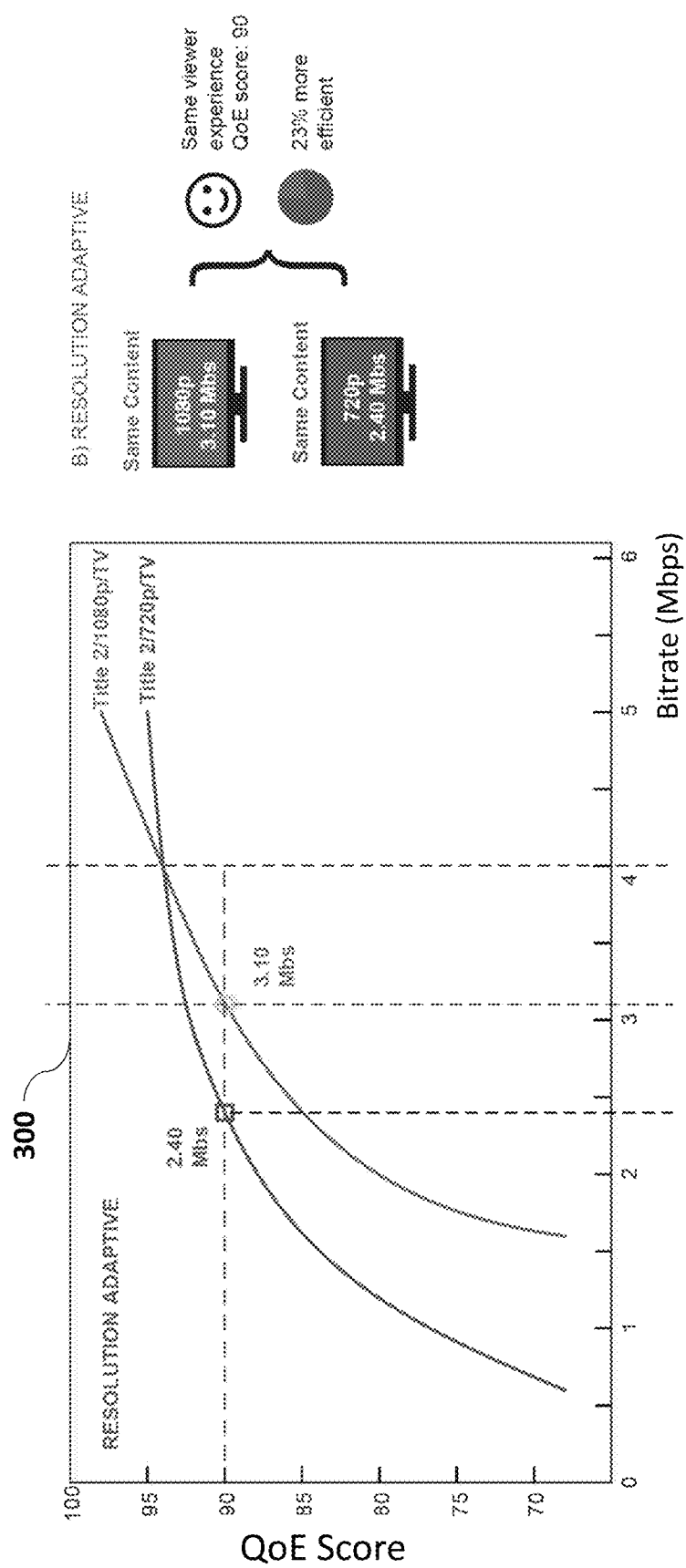
FIG. 3 illustrates a graph showing example bitrates at different resolutions to achieve a target QoE score for a video title.

FIG. 3 illustrates a graph 300 showing example bitrates at different resolutions to achieve a target QoE score for a video title. Again the X-axis indicates bitrate, while the Y-axis indicates perceptual quality assessment metric at the bitrate. In this example, a QoE score of 90 is targeted for the encoding of the video at two different resolutions: 1080p, and 720p (e.g., 1280×720). As indicated for 1080p, a minimum bitrate of 3.1 Mbps may be used to achieve the target QoE score. As indicated for 720p, a minimum bitrate of 2.4 Mbps may be used to achieve the target QoE score. Based on these bitrates and QoE scores, encoding at 720p may be performed 23% more efficiently than the encoding at 1080p. Thus, a scheme that adapts encoding to output resolution (i.e., resolution adaptation) may result in a significantly lower bitrate.

Figure 4:
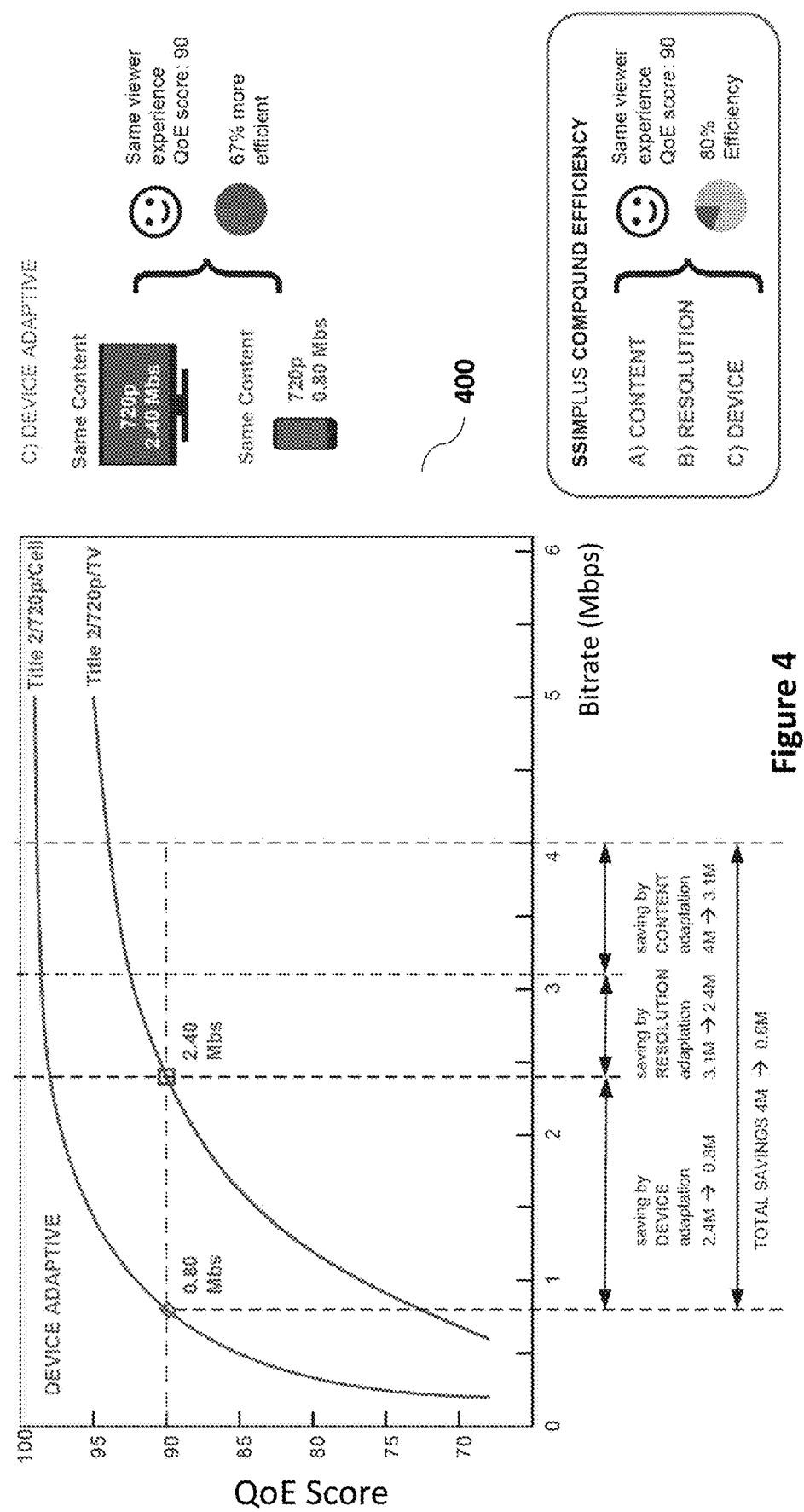
FIG. 4 illustrates a graph showing example bitrates at for different devices to achieve a target QoE score for a video title for a given resolution.

FIG. 4 illustrates a graph 400 showing example bitrates for different devices to achieve a target QoE score for a video title for a given resolution. Again, the X-axis indicates bitrate, while the Y-axis indicates perceptual quality assessment metric at the bitrate. In this example, a QoE score of 90 is targeted for the encoding of the video at 720p for two different device sizes: a television screen size and a cell phone screen size smaller than the television screen size. As indicated for the cell phone size, a minimum bitrate of 0.8 Mbps may be used to achieve the target QoE score. As indicated for the television size, a minimum bitrate of 2.4 Mbps may be used to achieve the target QoE score. Based on these device adaptations and scores, encoding for a cell phone may be performed 67% more efficiently than the encoding for a television. Thus, a scheme that adapts the encoding to screen size may result in a significantly lower bitrate.

Further, the effects of accounting for content complexity, screen resolution, and screen size can be compounded. In this example, the savings for content adaptation (e.g., similar to as shown in FIG. 2) provide for a reduction in bitrate from 4.0 Mbps to 3.1 Mbps, the savings for resolution adaptation (e.g., similar to as shown in FIG. 3) provide for a reduction in bitrate from 3.1 Mbps to 2.4 Mbps, and the savings for device adaptation (e.g., screen size) provide for a reduction in bitrate from 2.4 Mbps to 0.8 Mbps. Overall the combined savings provide for a reduction in bitrate from 4.0 Mbps to 0.8 Mbps, resulting in an encoding that is 80% more efficient than were these factors not considered.

Figure 5:
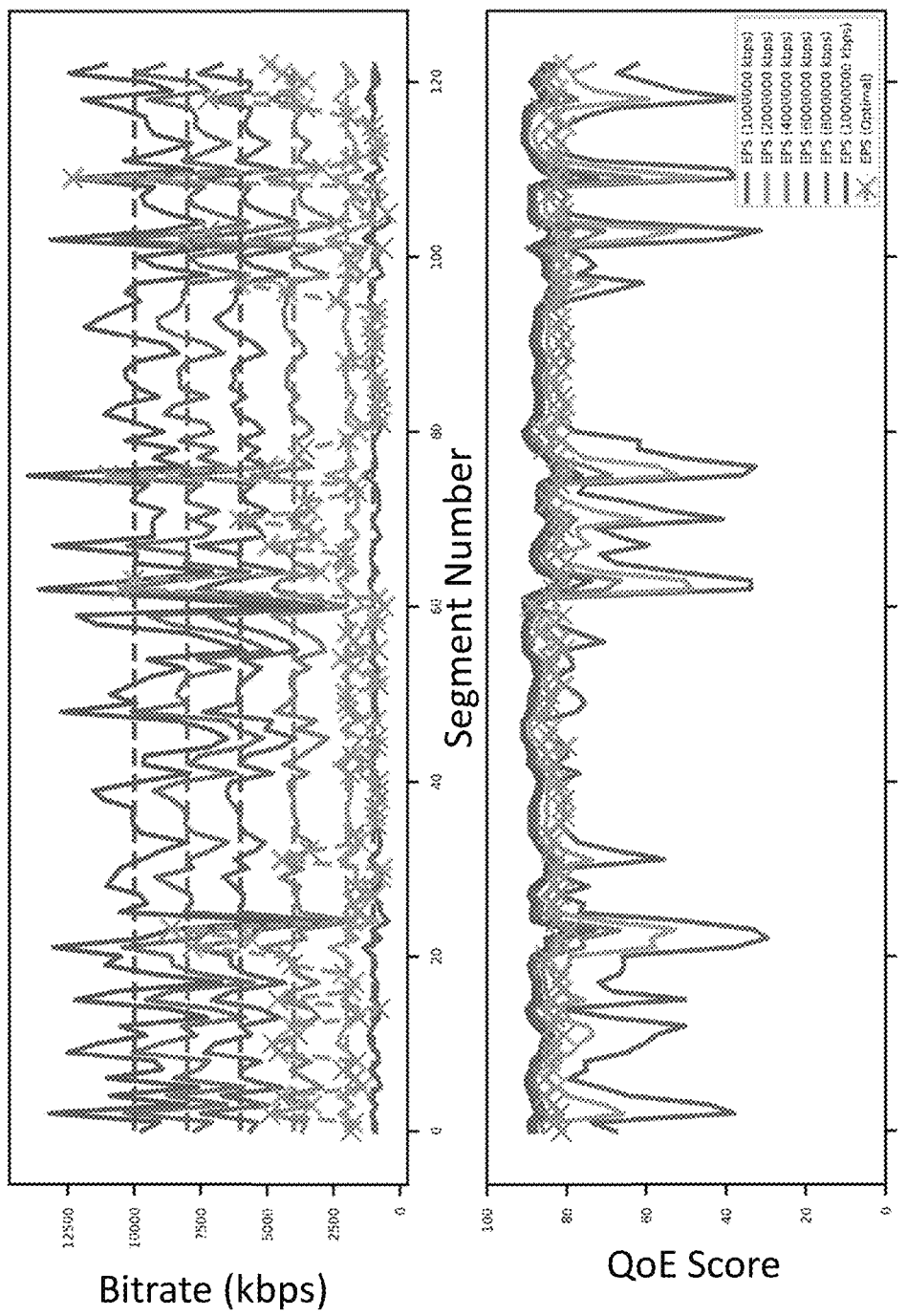
FIG. 5 illustrates selection of segments, chunks, or scenes that achieves the target QoE score at the lowest possible bitrate.

FIG. 5 illustrates selection of segments, chunks, scenes, or chapters that achieves a target QoE score at the lowest possible bitrate. As shown, six encodes have been performed for a video stream (e.g., from top to bottom: 10 Mbps, 8 Mbps, 6 Mbps, 4 Mbps, 2 Mbps, and 1 Mbps). The bitrates of these encodings is plotted by segment number in the graph 500. For the same time period, the graph 502 plots the QoE scores of the six encodes by segment number.

In this example, a target QoE score of 80 is set for the content. Accordingly, for each segment the encode with the lowest bitrate that also meets the target QoE score is selected as being the optimal encode choice for that segment. These optimal encodes are marked in the graphs 500 and 502 with an "X". It can be seen that to meet the target QoE score of 80, many of the segments make use of the 1 Mbps encode or the 2 Mbps encode, while only a few segments use the higher bitrate encodes. These selected segments may be joined together to form a video steam that is bandwidth optimized for experiencing the content at the target QoE score. While this example is by segment, in other examples the unit may be chunk, scene, chapter, or asset.

Figure 6:
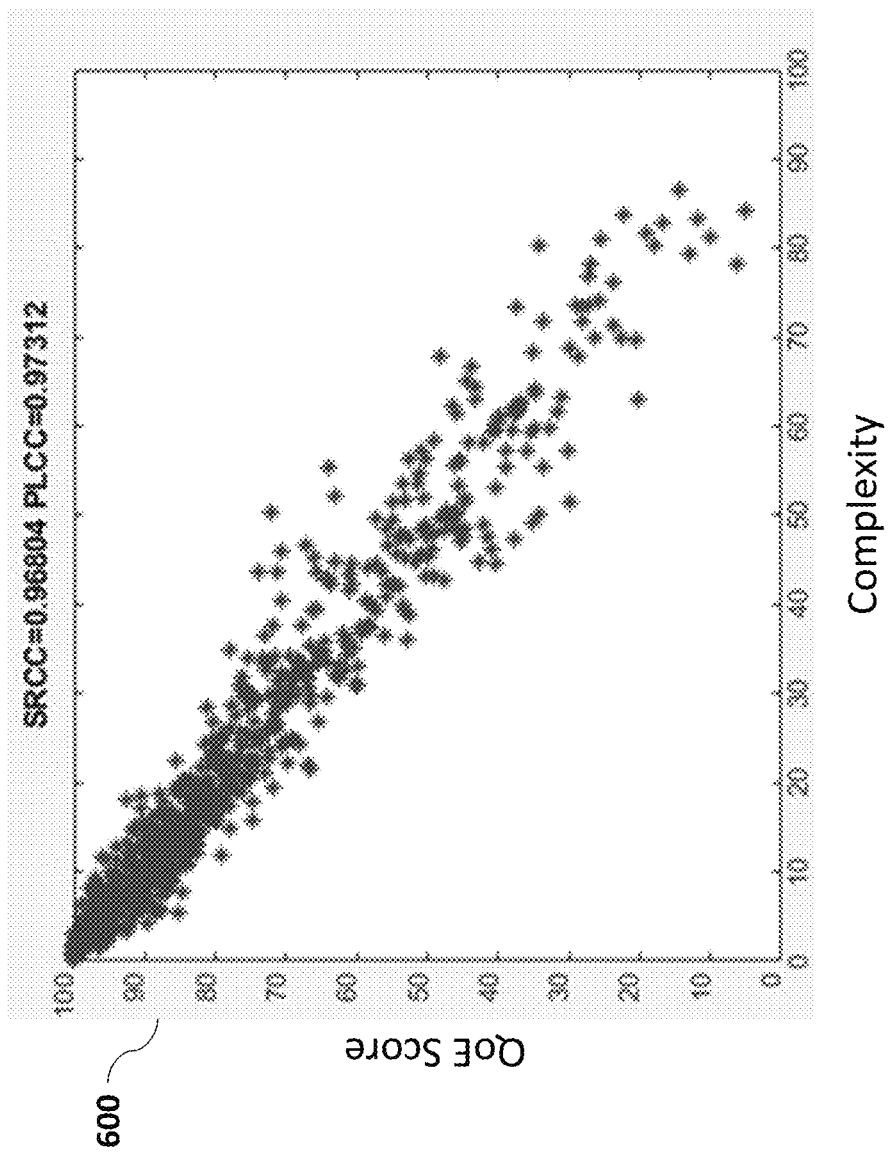
FIG. 6 illustrates an example graph of a relationship between content complexity and perceptual quality assessment.

FIG. 6 illustrates an example graph 600 of a relationship between content complexity and perceptual quality assessment. Here, the X-axis indicates content complexity, while the Y-axis indicates perceptual quality assessment metric at the bitrate. Content complexity generally refers to how complex the video is in terms of its spatial and temporal information. Various approaches may be used to measure the content complexity of a video stream. These approaches may include, as some examples, image feature extraction and mathematical modeling, image feature extraction and classification using a neural network, and precoding and analysis. As shown, content complexity is measured along an arbitrary scale of 0 to 100, where higher complexity numbers mean higher complexity. It can be seen from the graph 600 that, in general, there is an inverse relationship between content complexity and perceptual quality assessment metric, meaning that more complex content is generally perceived at a lower QoE, all else being equal. Thus, a measure of content complexity may be used as a guide to aid in encoding content to meet a target QoE score.

Figure 7:
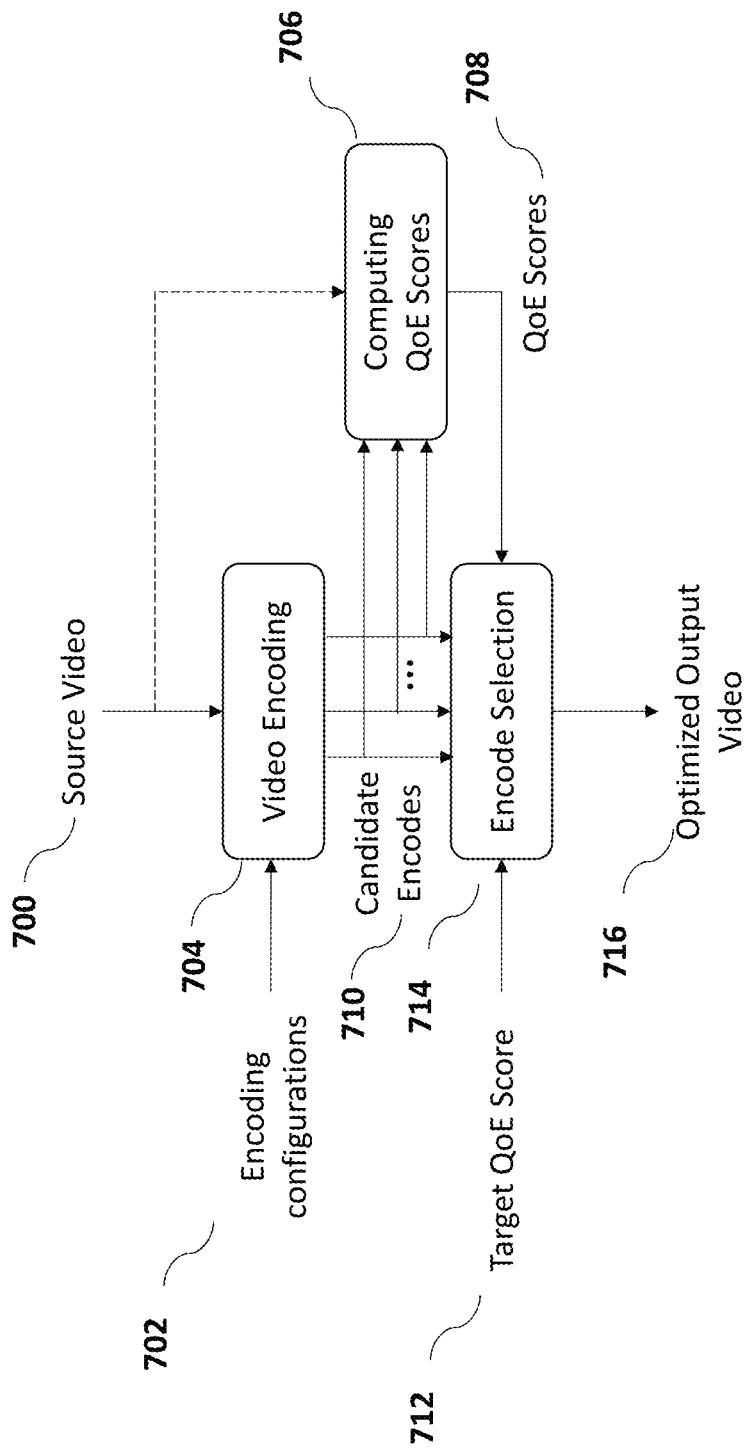
FIG. 7 illustrates an example process for content-aware encoding based on QoE score.

FIG. 7 illustrates an example process for content-aware encoding based on QoE score. As shown, a source video 700 is encoded using various encoding configurations 702 by a video encoder at operation 704. Each encoding configuration 702 specifies a set of settings that may be used to encode the source video 700 into a candidate encode 710. These settings may indicate a bitrate for the encode, as well as other aspects such as frame size, frame rate, aspect ratio, dynamic range, color settings, audio settings, etc. The encoder produces various candidate encodes 710 using the encoding configurations 702. At operation 706, QoE scores 708 are computed for each of the candidate encodes (and optionally using the source video 700 as a reference for perceptual quality assessment of the candidate encodes 710). At operation 714, encode selection is performed using the QoE scores 708 corresponding to the candidate encodes 710 in comparison with a target QoE score 712. For instance, the candidate encode 710 having the lowest bitrate (per the encoding configuration 702) and a QoE score 708 that achieves the target QoE score 712 may be selected to be the optimized output video 716 that is output. In some examples, further characteristics may be optimized along with QoE using an objective function for the selection of the candidate encode, such as consideration of meeting the target QoE score 712 in combination with minimizing an encoding cost for use of that encoding configuration 702 (e.g., per minute of video encoded, per server, or per software application) and/or minimizing a delivery cost (e.g., based on GB of data delivered).

Figure 8:
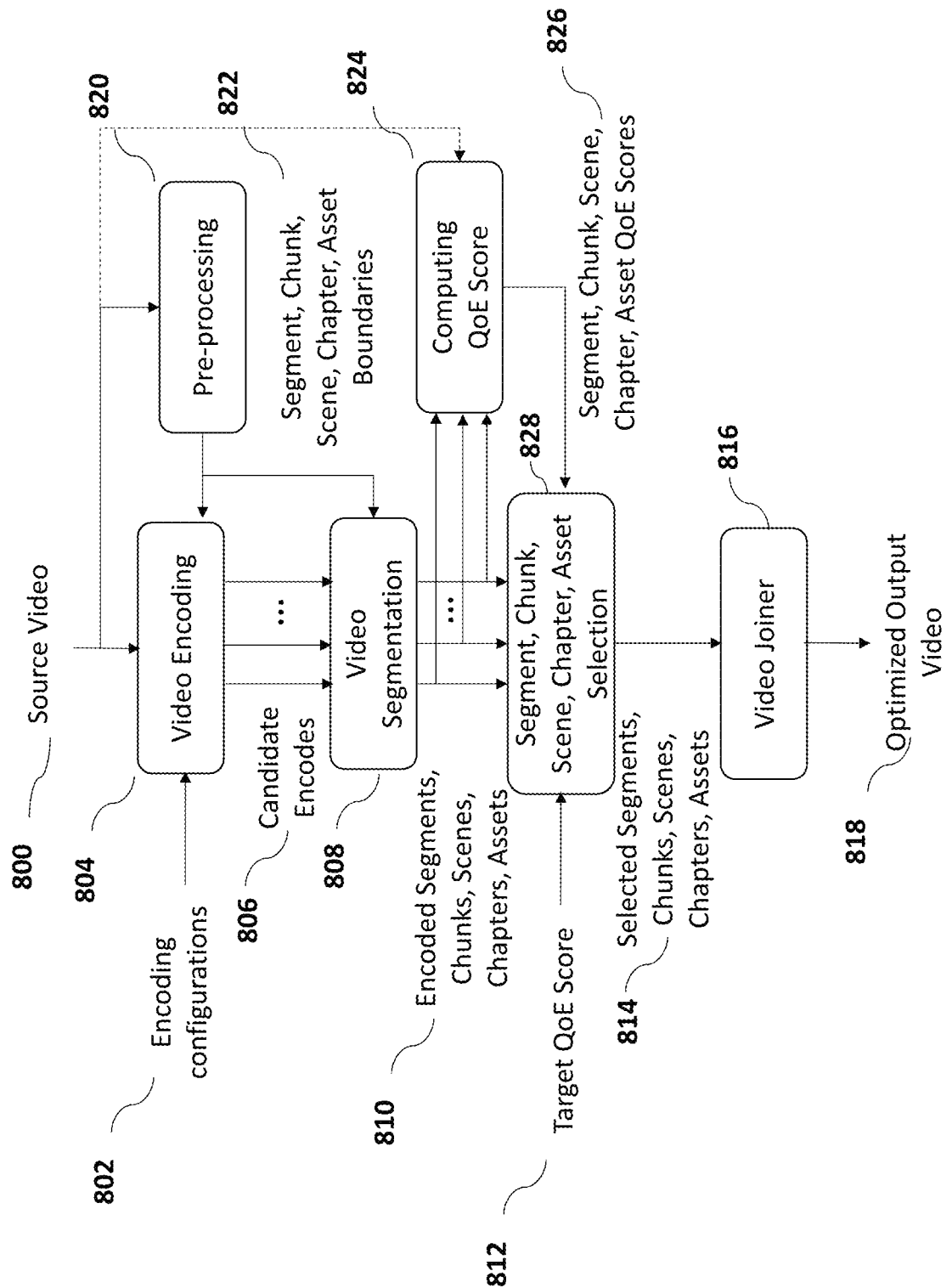
FIG. 8 illustrates an example process for viewer and content-aware encoding based on QoE score at a segment, chunk, or scene level.

FIG. 8 illustrates an example process for viewer and content-aware encoding based on QoE score at a scene, segment, chunk, chapter, or asset level. As shown, a source video 800 is encoded using various encoding configurations 802 by a video encoder at operation 804. The encoder produces various candidate encodes 806 using the encoding configurations 802.

Additionally using the source video 800, at operation 820 pre-processing is performed to identify segment, chunk, scene, chapter, or asset boundaries 822. The video segments or chunks may be collections of video frames divided out during segmentation or fragmentation of the content. The chunk size may be set empirically in many examples. In some examples, scene boundaries may be natural boundaries in the content between scenes or other portions of the content. In some examples, scene, chapter, and/or asset boundaries may be defined by the content itself or by content metadata and may be used as boundaries as well. Using the candidate encodes 806 and the segment, chunk, scene, chapter, or asset boundaries 822, at operation 808 video segmentation is performed to divide the candidate encodes 806 into encoded segments, chunks, scenes, chapters or assets 810 at the segment, chunk, scene, chapter, or asset boundaries 822.

At operation 824, segment, chunk, scene, chapter, or asset QoE scores 826 are computed for each of the encoded segments, chunks, scenes, chapters or assets 810 (and optionally using the source video 800 as a reference for perceptual quality assessment of the encoded segments, chunks, scenes, chapters or assets 810). At operation 828, segment, chunk, scene, chapter, or asset selection is performed using the segment, chunk, scene, chapter, or asset QoE scores 826 corresponding to the encoded segment, chunk, scene, chapter, or asset 810 in comparison with a target QoE score 812. For instance, the encoded segments, chunks, scenes, chapters, or assets 810 having the lowest bitrate and a segment, chunk, scene, chapter, or asset QoE score 826 that achieves the target QoE score 812 may be selected to be the selected segments, chunks, scenes, chapters, or assets 814. At operation 816, these selected segments, chunks, scenes, chapters, or assets 814 are joined to form an optimized output video 818.

Figure 9:
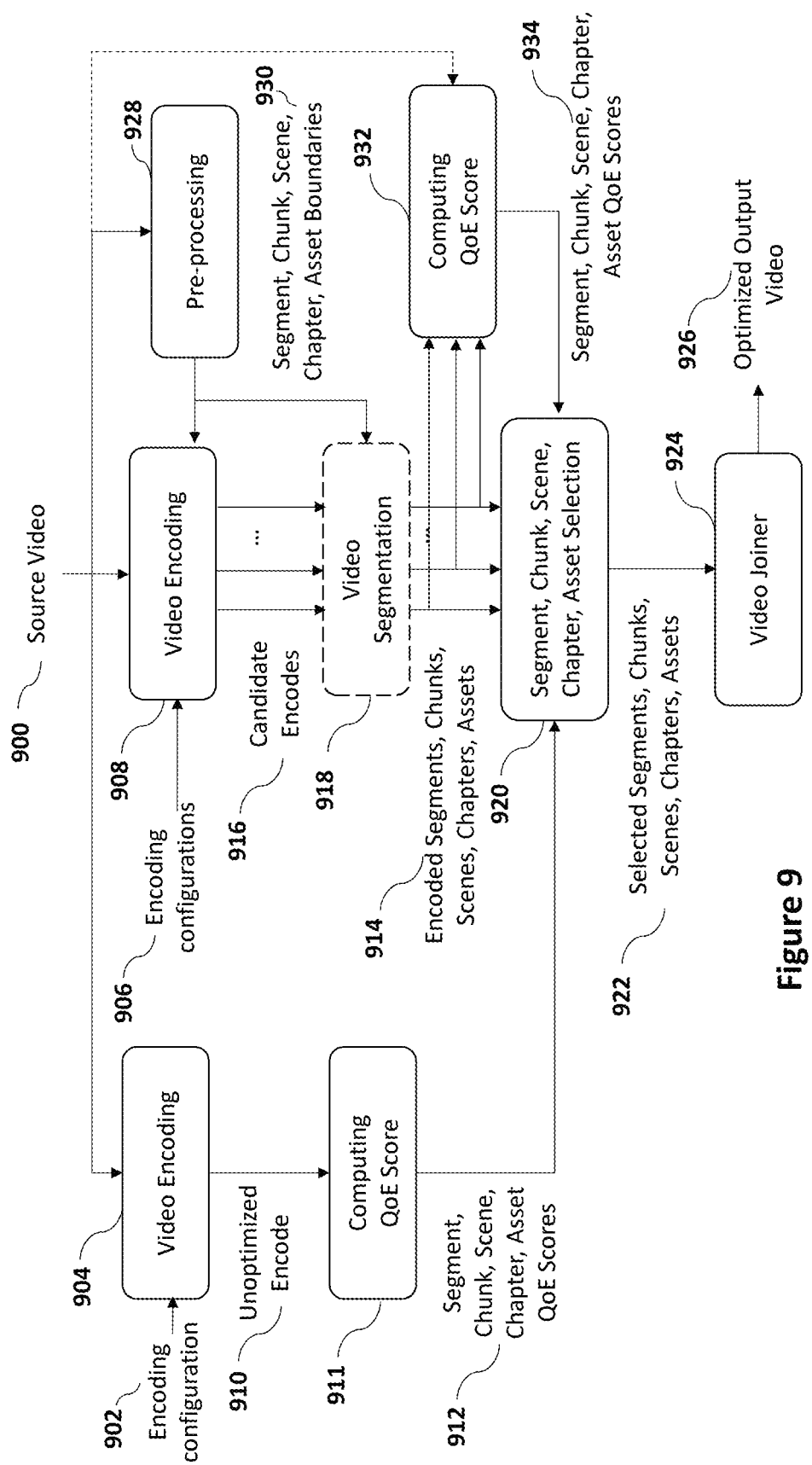
FIG. 9 illustrates an example process for encoding optimization to achieve the same QoE score as an existing encode with a lower bitrate.

FIG. 9 illustrates an example process for encoding optimization to achieve the same QoE score as an existing encode with a lower bitrate. As shown, a source video 900 is encoded using various encoding configurations 906 by a video encoder at operation 908. The encoder produces various candidate encodes 916 using the encoding configurations 906.

Additionally, using the source video 900, at operation 928 pre-processing is performed of the source video 900 to determine segment, chunk, scene, chapter, or asset boundaries 930. Using the candidate encodes 916 and the segment, chunk, scene, chapter, or asset boundaries 930, at operation 918 video segmentation is performed to divide the candidate encodes 916 into encoded segments, chunks, scenes, chapters, or assets 914 at the segment, chunk, scene, chapter, or asset boundaries 930. At operation 932, segment, chunk, scene, chapter, or asset QoE scores 934 are computed for each of the encoded segments, chunks, scenes, chapters, or assets 914 (and optionally using the source video 900 as a reference for perceptual quality assessment of the encoded segments, chunks, scenes, chapters, or assets 914).

Again, using the source video 900, at operation 904 the source video 900 is encoded using a base or benchmark unoptimized encoding configuration 902 by a video encoder at operation 904. This encoding configuration 902 may, in many examples, be a configuration set up by a customer for use by the customer in encoding content. The encoder thereby produces an unoptimized candidate encode 910 using the encoding configurations 902. At operation 911, target segment, chunk, scene, chapter, or asset QoE scores 912 are computed for the unoptimized encode 910. These target segment, chunk, scene, chapter, or asset QoE scores 912 may be computed for the segments, chunks, or scenes according to the segment, chunk, or scene boundaries 930.

At operation 920, segment, chunk, scene, chapter, or asset selection is performed using the segment, chunk, scene, chapter, or asset QoE scores 934 corresponding to the encoded segments, chunks, or scenes 914 in comparison with segment, chunk, scene, chapter, or asset level target QoE scores 912. For instance, the encoded segments, chunks, scenes, chapters, or assets 914 having the lowest bitrate and a segment, chunk, scene, chapter, or asset QoE score 934 that achieves the corresponding target segment, chunk, scene, chapter, or asset level target QoE score 912 may be selected to be the selected segments, chunks, scenes, chapters, or assets 922. At operation 924, these selected segments, chunks, scenes, chapters, or assets 922 are joined to form an optimized output video 926.

Figure 10:
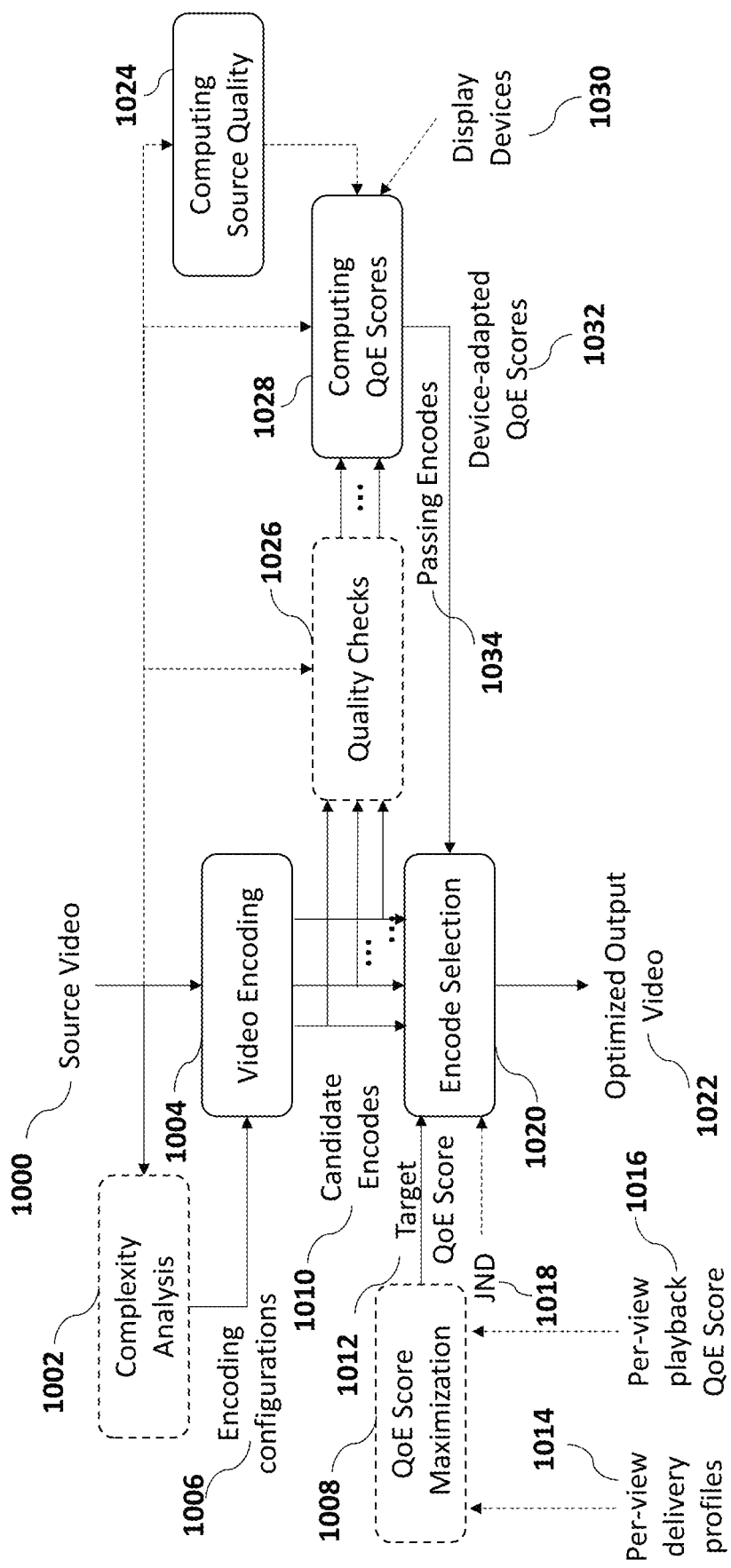
FIG. 10 illustrates an example process for viewer and content-aware encoding based on QoE scores.

FIG. 10 illustrates an example process for viewer and content-aware encoding based on QoE scores. As shown, at operation 1002 a complexity analysis is performed of a source video 1000 to determine a complexity metric indicative of how complex the source video 1000 is in terms of its spatial and temporal information. For instance, the complexity metric may be a function of the human perceptual QoE score, such that a higher complexity score relates to a lower perceptual quality of experience and a lower complexity score relates to a higher perceptual QoE. The complexity metric may be used to determine the number and/or bitrates of the candidate encoding configurations 1006. For instance, if the source video 1000 is of a content complexity below a threshold, then higher bitrate encodes (e.g., 8 Mbps, 10 Mbps, 12 Mbps, 14 Mbps, etc.), may be unnecessary and instead finer gradations of lower bitrate encodes may be chosen (e.g., 3 Mbps, 2 Mbps, 1.5 Mbps, 1 Mbps, etc.). Or, in the reverse, if the source video 1000 is of a content complexity above a threshold, then higher bitrate encodes may be required to ensure meeting the target QoE score, and the finer gradations of lower bitrate encodes may be unnecessary. In one example approach, the source video 1000 may be categorized into one of a plurality of buckets according to the content complexity metric, where each bucket representing a category of video content having a different range of content complexity scores and being associated with an ABR ladder specific to that range. At operation 1004, the source video 1000 is encoded by a video encoder using the various encoding configurations 1006 identified at operation 1002. This results in various candidate encodes 1010.

At operation 1026, quality checks are performed on the candidate encodes 1010. These quality checks may include validations of the structure of the candidate encodes 1010, such to ensure that the bitstream is not corrupted, and/or to ensure that parity checks in the candidate encodes 1010 are correct. These quality checks may additionally or alternately relate to validation of the quality of the image of the candidate encodes 1010, such as checks for one or more of banding, blocking, exposure shift, color shift, skin tone deviation, highlight details, shadow details, and texture details. If a candidate encode 1010 is identified as failing one or more of the quality checks, then that candidate encode 1010 may be disqualified from further consideration. However, if the candidate encode 1010 passes the quality checks, then that candidate encode 1010 is further considered at operation 1028 as a passing encoding 1034. It should be noted that the quality checks may be optional, and in some examples all candidate encodes 1010 qualify as passing encodings 1034 for further analysis.

At operation 1024, the content quality of the source video 1000 may be determined. The content quality of the source video 1000 may be determined based on factors such as checks for compression impairments, macroblocking, jitter, loss of details, banding, exposure shift, color shift, skin tone deviation, highlight details, shadow details, and texture details. The content quality of the source video 1000 may be used as an input to determine an absolute QoE of the candidate encodes 1010. The content quality of the source video 1000 is a useful input because quality at the output of an encoder depends on both the encoding quality and also the quality of the source video 1000 itself. Quality at the output of an encoder would be low, even if an encoder performs well, when the source video 1000 quality is low. In order to compute absolute quality at the output of an encoder, both the source and encode quality are therefore taken into account. When the target QoE required at the output of an encoder is set as an absolute QoE and not just encoding performance, the encoding optimization process has less room to introduce quality delta, if the source has less than a 100 score. For example, if a target QoE score is 80 and the source QoE is 90, an encoder has a room of 10 points.

At operation 1028, QoE scores 1032 are computed for each of the passing encodings 1034 considering the content quality of the source video 1000. The QoE scores 1032 as determined may be adapted according to the source content quality to determine the absolute QoE of the candidate encodes 1010. For instance, the QoE scores 1032 of the candidate encodes 1010 may be low, even when encoding performs very well, due to artifacts that are a result of low source content quality. As the goal is to achieve target absolute QoE at the output of an encoding stage, candidate encodes 1010 should compensate for the low quality of the source video 1000, by selecting candidate encodes that provide the desired encoding performance. This encoding performance may relate to the difference in quality between the quality of the source video 1000 and the quality of the candidate encodes 1010.

The QoE scores 1032 as determined may also be adapted to a target display device 1030, or even adapted to multiple target display devices 1030. For instance, in generating the QoE scores a multi-dimensional quality map of the video being assessed is generated, where the map indicates local quality variations of the video in a multi-dimensional space. A viewing resolution factor in the unit of pixels per degree of visual angle using the parameters or a subset of parameters of viewing window/screen size, device screen resolution, replay temporal resolution, viewing distance, device screen contrast, viewing angle, and viewing window resolution is also identified. The viewing resolution factor may then be used in the combination of the multi-dimensional quality map into a scalar or vector-valued measure on the quality of the video being assessed. Further aspects of the computation of QoE scores may be found in U.S. Pat. No. 10,165,281, "Method and system for objective perceptual video quality assessment," the contents of which is incorporated by reference herein in its entirety. This allows, for instance, smaller screens to indicate relatively higher QoE scores than larger screens. Regardless of the specifics, these adaptations result in the determination of device-adapted QoE scores 1032.

At operation 1008, a QoE maximization is performed to identify a target QoE score 1012. In one example, the delivery performance is measured at a per-view level of a content delivery network to deliver content encoded using an ABR ladder. The ABR ladder may include several encoding configurations outlining a spectrum of bitrate/resolution combinations used to encode video content. The viewer devices may then choose among the available ladder encodings based on bandwidth or other device requirements. A maximum QoE score that can be achieved across all viewers considering delivery performance of the content delivery network is computed. For instance, if there is too much network usage, then the viewer devices may be unable to receive higher bit rate streams, even though if there were less network usage such bit rates would be preferable as providing better QoE to those viewer devices. Since a higher target score cannot be achieved, a maximum QoE score that can be achieved across all viewers considering delivery performance of the content delivery network is computed. For instance, this maximum QoE score may account for total bandwidth available for the devices, quantity of devices requesting playback, etc.

In another example, playback performance at a per-view level of a video player is measured to playback content encoded using an ABR ladder, and a maximum QoE score that can be achieved across all viewers of the content considering playback experience is computed. For instance, some viewer devices have smaller or larger screens (or other characteristics) that affect the maximum QoE score that can be achieved. Using these device characteristics, device adaptations may be made to the maximum QoE score that can be achieved.

In yet another example, display devices used to view a live or on-demand video asset are determined, and a maximum QoE score that can be achieved across all viewers watching the on-demand or live content across the display devices is computed. As discussed above, this maximum QoE score may account for delivery performance of the content delivery network and/or playback performance with respect to the end devices. Regardless of approach, this maximum QoE score may be used as the target QoE score 1012.

As yet a further example, the target QoE score is adjusted to consider popularity and viewership of an asset. For instance, the higher the popularity of a video, the higher the target QoE and vice versa, in order to maximize viewer experience across all views.

At operation 1020, encode selection is performed, using the device-adapted QoE scores 1032 corresponding to the candidate encodes 1010 that qualified as passing encodings 1034, in comparison with the target QoE score 1012. For instance, the candidate encode 1010 having the lowest bitrate and a device-adapted QoE score 1032 that achieves the target QoE score 1012 may be selected to be the optimized output video 1022 that is output.

Moreover, in some examples, the encode selection may further consider a just-noticeable difference (JND) 1018. JND 1018 relates to the perceptual concept of the amount that a quantity must be changed in order for a difference to be noticeably detectable by an observer all of the time (or in other examples at least half of the time). The JND 1018 may sometimes be related as a constant that is equal to the ratio of the addition of intensity required for an input to be perceived to the original intensity. A model of a human visual system may be used to determine the just discerned signal difference by the visual system and may be affected by a number of human visual system features such as the contrast sensitivity function, and the luminance, contrast and texture masking effects. In some examples, the JND 1018 may be set in part empirically based on an evaluation of user perception. The lowest bitrate encode that is within the JND 1018 from the target QoE score 1012 may be selected, as opposed to merely the lowest bitrate encode that achieves the target QoE score 1012. This may allow for differences that are imperceptible to the user to be ignored, thereby allowing for a lower bitrate encode than might otherwise be indicated were these differences deemed to be perceptible.

Figure 11:
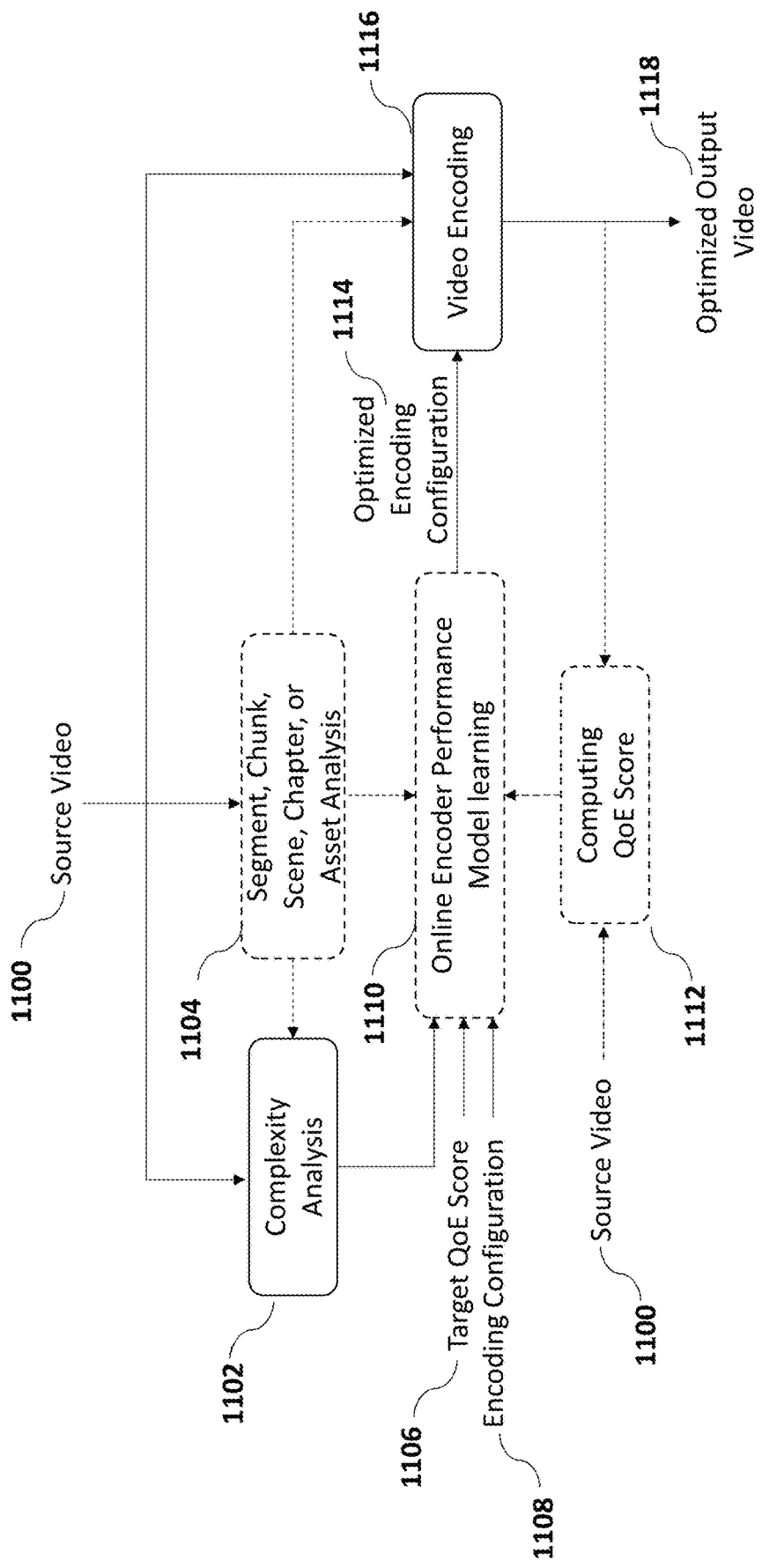
FIG. 11 illustrates an example process for viewer and content-aware encoding based on QoE scores using content complexity offline and online encoding performance models.

FIG. 11 illustrates an example process for viewer and content-aware encoding based on QoE scores using content complexity offline and online encoding performance models. At operation 1102, a complexity analysis is performed on a source video 1100. For example, as discussed above, a content complexity metric may be produced by pre-processing the source video 1100 content to determine a relative difficulty for encoding the source video 1100.

At operation 1110, the content complexity metric is transformed to determine an absolute difficulty for encoding the source video 1100 using an encoder configuration 1108. This transformation may be used to update an encoding configuration 1108 to be specific to the implementation of the encoder to be used. This may be desirable, as different encoders and encoding configurations 1108 may have different strengths and weaknesses with respect to content features. For instance, encoding configurations 1108 for a H.265 High Efficiency Video Coding (HEVC) encoder may differ from the encoding configurations 1108 for an H.264 Advanced Video Coding (AVC) encoder. The result of this transformation is an optimized encoding configuration 1114. At operation 1116, the source video 1100 is encoded using the optimized encoding configuration 1114. This results in an optimized output video 1118.

Referring more specifically to the transformation of the encoding configuration 1108, a machine learning model may be used to improve the encoder-specific transformation, using a feedback loop that provides an actual QoE score for the source video 1100 as computed at operation 1112, to achieve a target QoE score 1106 with a smaller error. For instance, continuing with the example of a target QoE score 1106 of 80, if after encoding it is determined that the actual QoE score for the video is 82, not 80, then that information can be used as ground truth to further train the machine learning model.

In some examples, the operations of the process may be performed for the source video 1100 overall. In other examples, as shown at operation 1104, further pre-processing is performed to identify segment, chunk, scene, chapter, or asset boundaries. Using these boundaries, the complexity analysis operation 1102, the online encoder performance model learning operation 1110, and the video encoding operation 1116 may be performed on a per segment, chunk, scene, chapter, or asset basis, as opposed to on an overall source video 1100 basis.

Figure 12:
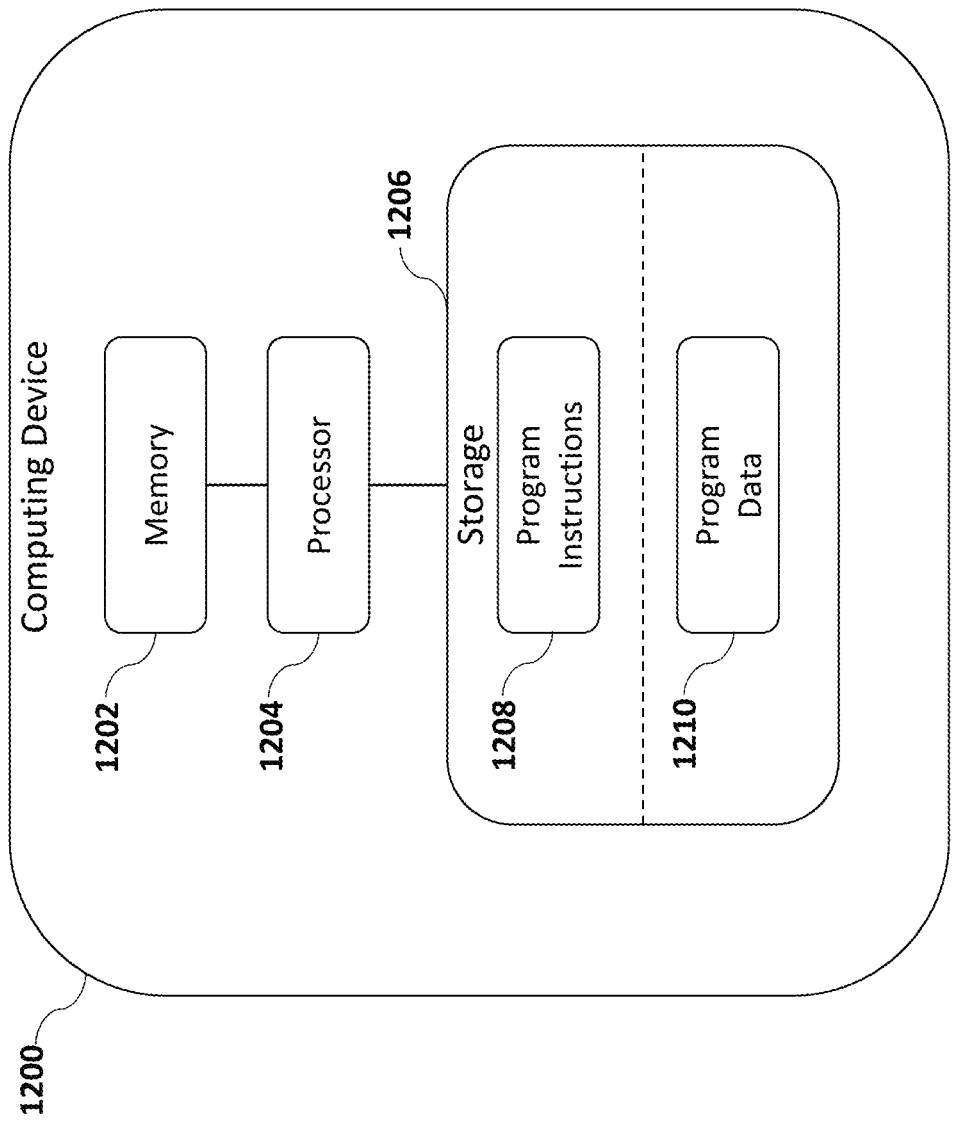
FIG. 12 illustrates an example computing device for optimization of video encoding in digital images and videos using a perceptual quality assessment metric.

FIG. 12 illustrates an example computing device 1200 for performing optimization of video encoding in digital images and videos using a perceptual quality assessment metric. The algorithms and/or methodologies of one or more embodiments discussed herein, such as those illustrated with respect to FIGS. 7-11, may be implemented using such a computing device 1200. The computing device 1200 may include memory 1202, processor 1204, and non-volatile storage 1206. The processor 1204 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 1202. The memory 1202 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 1206 may include one or more persistent data storage devices such as a hard drive, optical drive, tape drive, non-volatile solid-state device, cloud storage or any other device capable of persistently storing information.

The processor 1204 may be configured to read into memory 1202 and execute computer-executable instructions residing in program instructions 1208 of the non-volatile storage 1206 and embodying algorithms and/or methodologies of one or more embodiments. The program instructions 1208 may include operating systems and applications. The program instructions 1208 may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Upon execution by the processor 1204, the computer-executable instructions of the program instructions 1208 may cause the computing device 1200 to implement one or more of the algorithms and/or methodologies disclosed herein. The non-volatile storage 1206 may also include data 1210 supporting the functions, features, and processes of the one or more embodiments described herein. This data 1210 may include, as some examples: encoding configurations; QoE Scores; source video; encoded video output; segment, chunk or scene boundaries; per-view delivery profiles, per-view playback QoE scores, display device information for adaptation, and JND data.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for optimization of video encoding using perceptual quality assessment, comprising:
   producing a content complexity metric by pre-processing source content to determine a relative difficulty for encoding the source content, the content complexity metric being independent of encoder implementation;
   transforming the content complexity metric into an absolute difficulty for encoding the source content, the absolute difficulty being specific to the encoder implementation;
   utilizing the absolute difficulty to determine an encoding configuration for the source content, the encoding configuration specifying a bitrate to achieve a target QoE score for the source content when encoded into an output encode using the encoder implementation; and
   performing video encoding of the source content using the encoding configuration for the encoder implementation to create the output encode.

2. The method of claim 1, further comprising utilizing the absolute difficulty to determine a set of encode configurations to use to encode the source content using the encoder implementation.

3. The method of claim 1, further comprising:
   utilizing an encoder-specific complexity model for transforming the content complexity metric into the absolute difficulty specific to the encoder implementation;

computing an actual QoE score of the output encode; and
utilizing machine learning to retrain the encoder-specific complexity model to improve the ability of the encoder-specific complexity model to predict the target QoE score with a smaller error, the retraining using the actual QoE score as ground truth.

4. The method of claim 1, further comprising:
producing the content complexity metric by processing the source content to determine the relative difficulty for encoding the source content for every profile of an adaptive bitrate (ABR) ladder; and
utilizing the content complexity metric to determine number of encodes and their configurations for every profile of an ABR ladder.

5. The method of claim 1, further comprising:
producing encoder-specific content complexity metrics for a plurality of encoding standards, configurations, and implementations; and
selecting the encoding standard, configuration, and implementation that provides a best perceptual experience within bitrate and compute complexity constraints.

6. The method of claim 5, further comprising selecting the encoding standard, configuration, and implementation that provides a best perceptual experience at a lowest compute and/or delivery cost.

7. The method of claim 1, further comprising:
producing the content complexity metric by pre-processing the source content to determine the relative difficulty for encoding the source content, the content complexity metric indicating a measure of how detailed the source content is in terms of spatial and temporal information;
using the content complexity metric to classify the source content into one of a pre-determined set of buckets, each bucket representing a category of video content having a different range of content complexity scores and being associated with an ABR ladder specific to the range; and
encoding the video according to the ABR ladder of the one of the pre-determined set of buckets into which the source content is categorized.

8. The method of claim 7, further comprising producing ABR ladders that achieve the target QoE score for each of the buckets using an encoder implementation, standard, or encoding configuration.

9. A system for optimization of video encoding using perceptual quality assessment, comprising:
a computing device programmed to
produce a content complexity metric by pre-processing source content to determine a relative difficulty for encoding the source content, the content complexity metric being independent of encoder implementation;
transform the content complexity metric into an absolute difficulty for encoding the source content, the absolute difficulty being specific to an encoder implementation;
utilize the absolute difficulty to determine an encoding configuration for the source content, the encoding configuration specifying a bitrate to achieve a target QoE score for the source content when encoded into an output encode using the encoder implementation; and
perform video encoding of the source content using the encoding configuration for the encoder implementation to create the output encode.

10. The system of claim 9, wherein the computing device is further programmed to utilize the absolute difficulty to determine a set of encode configurations to use to encode the source content using the encoder implementation.

11. The system of claim 9, wherein the computing device is further programmed to:
utilize an encoder-specific complexity model for transforming the content complexity metric into the absolute difficulty specific to the encoder implementation;
compute an actual QoE score of the output encode; and
utilize machine learning to retrain the encoder-specific complexity model to improve the ability of the encoder-specific complexity model to predict the target QoE score with a smaller error, the retraining using the actual QoE score as ground truth.

12. The system of claim 9, wherein the computing device is further programmed to:
produce the content complexity metric by processing the source content to determine the relative difficulty for encoding the source content for every profile of an ABR ladder; and
utilize the complexity metric to determine number of encodes and their configurations for every profile of the ABR ladder.

13. The system of claim 9, wherein the computing device is further programmed to:
produce encoder-specific content complexity metrics for a plurality of encoding standards, configurations, and implementations; and
select the encoding standard, configuration, and implementation that provides a best perceptual experience within bitrate and compute complexity constraints.

14. The system of claim 13, wherein the computing device is further programmed to select the encoding standard, configuration, and implementation that provides the best perceptual experience at a lowest compute and/or delivery cost.

15. The system of claim 9, wherein the computing device is further programmed to:
produce the content complexity metric by pre-processing the source content to determine the relative difficulty for encoding the source content, the content complexity metric indicating a measure of how detailed the source content is in terms of spatial and temporal information;
use the content complexity metric to classify the source content into one of a pre-determined set of buckets, each bucket representing a category of video content having a different range of content complexity scores and being associated with an ABR ladder specific to the range; and
encode the video according to the ABR ladder of the one of the pre-determined set of buckets into which the source content is categorized.

16. The system of claim 15, wherein the computing device is further programmed to produce ABR ladders that achieve the target QoE score for each of the buckets using an encoder implementation, standard, or encoding configuration.

17. A non-transitory computer-readable medium comprising instructions for optimization of video encoding using perceptual quality assessment that when executed by one or more computing devices, cause the one or more computing devices to perform operations including to:
produce a content complexity metric by pre-processing source content to determine a relative difficulty for encoding the source content, the content complexity metric being independent of encoder implementation;

transform the content complexity metric into an absolute difficulty for encoding the source content, the absolute difficulty being specific to an encoder implementation;

utilize the absolute difficulty to determine an encoding configuration for the source content, the encoding configuration specifying a bitrate to achieve a target QoE score for the source content when encoded into an output encode using the encoder implementation; and perform video encoding of the source content using the encoding configuration for the encoder implementation to create the output encode.

18. The medium of claim 17, further comprising instructions that, when executed by the one or more computing devices, cause the one or more computing devices to perform operations including to:

utilize the absolute difficulty to determine a set of encode configurations to use to encode the source content using the encoder implementation.

19. The medium of claim 17, further comprising instructions that, when executed by the one or more computing devices, cause the one or more computing devices to perform operations including to:

utilize an encoder-specific complexity model for transforming the content complexity metric into the absolute difficulty specific to the encoder implementation;

compute an actual QoE score of the output encode; and utilize machine learning to retrain the encoder-specific complexity model to improve the ability of the encoder-specific complexity model to predict the target QoE score with a smaller error, the retraining using the actual QoE score as ground truth.

20. The medium of claim 17, further comprising instructions that, when executed by the one or more computing devices, cause the one or more computing devices to perform operations including to:

produce the content complexity metric by processing the source content to determine the relative difficulty for encoding the source content for every profile of an ABR ladder; and utilize the complexity metric to determine number of encodes and their configurations for every profile of the ABR ladder.

21. The medium of claim 17, further comprising instructions that, when executed by the one or more computing devices, cause the one or more computing devices to perform operations including to:

produce encoder-specific content complexity metrics for a plurality of encoding standards, configurations, and implementations; and select the encoding standard, configuration, and implementation that provides a best perceptual experience within bitrate and compute complexity constraints.

22. The medium of claim 21, further comprising instructions that, when executed by the one or more computing devices, cause the one or more computing devices to perform operations including to:

select the encoding standard, configuration, and implementation that provides the best perceptual experience at a lowest compute and/or delivery cost.

23. The medium of claim 17, further comprising instructions that, when executed by the one or more computing devices, cause the one or more computing devices to perform operations including to:

produce the content complexity metric by pre-processing the source content to determine the relative difficulty for encoding the source content, the content complexity metric indicating a measure of how detailed the source content is in terms of spatial and temporal information;

use the content complexity metric to classify the source content into one of a pre-determined set of buckets, each bucket representing a category of video content having a different range of content complexity scores and being associated with an ABR ladder specific to the range; and encode the video according to the ABR ladder of the one of the pre-determined set of buckets into which the source content is categorized.

24. The medium of claim 23, further comprising instructions that, when executed by the one or more computing devices, cause the one or more computing devices to perform operations including to:

produce ABR ladders that achieve the target QoE score for each of the buckets using an encoder implementation, standard, or encoding configuration.

* * * * *